INVENTORS
KENNETH G. ORR
KERMIT E. SHOCK
BY
Albert H Reuther
THEIR ATTORNEY

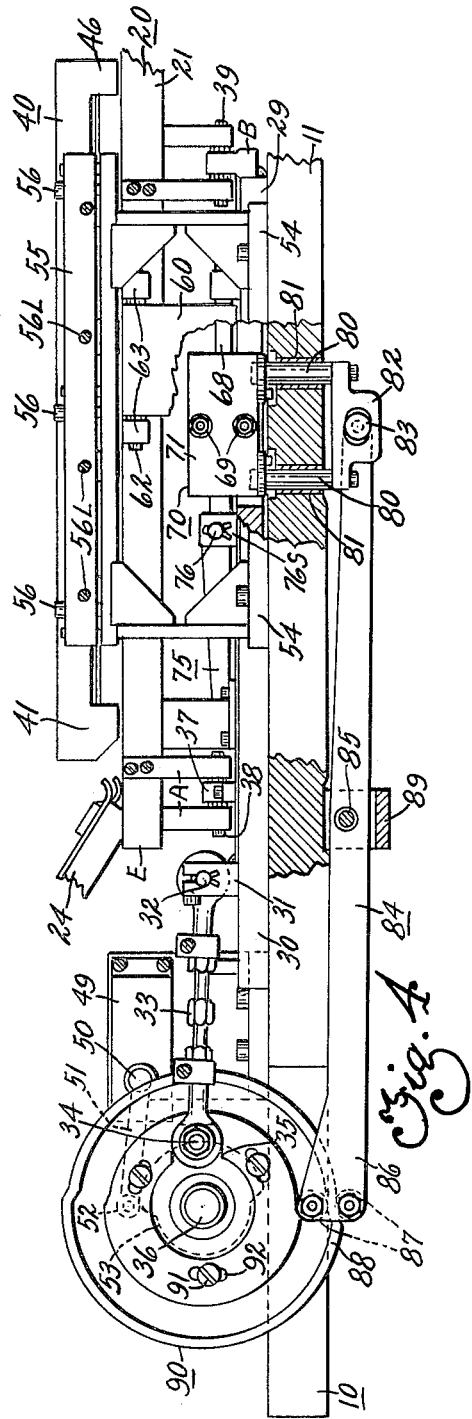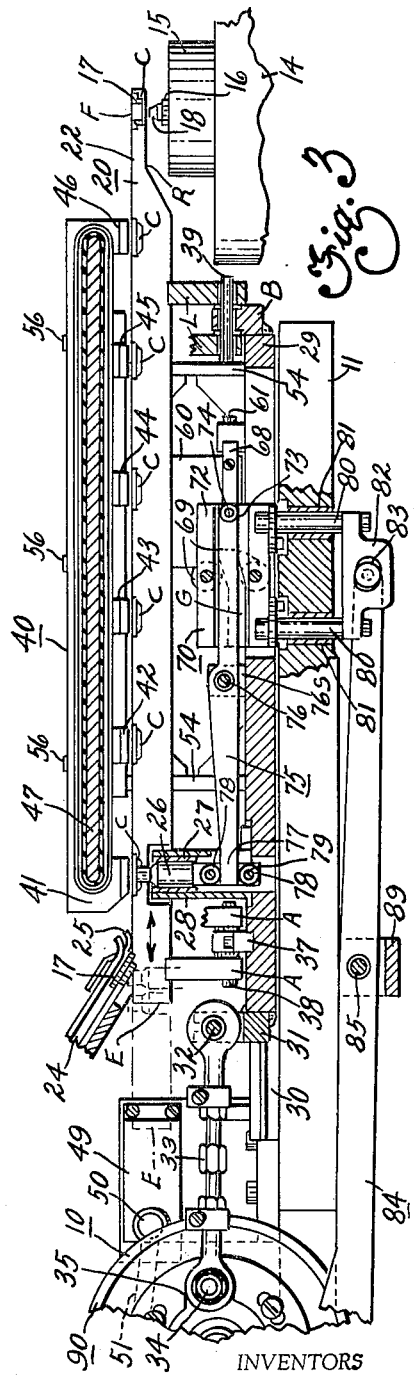

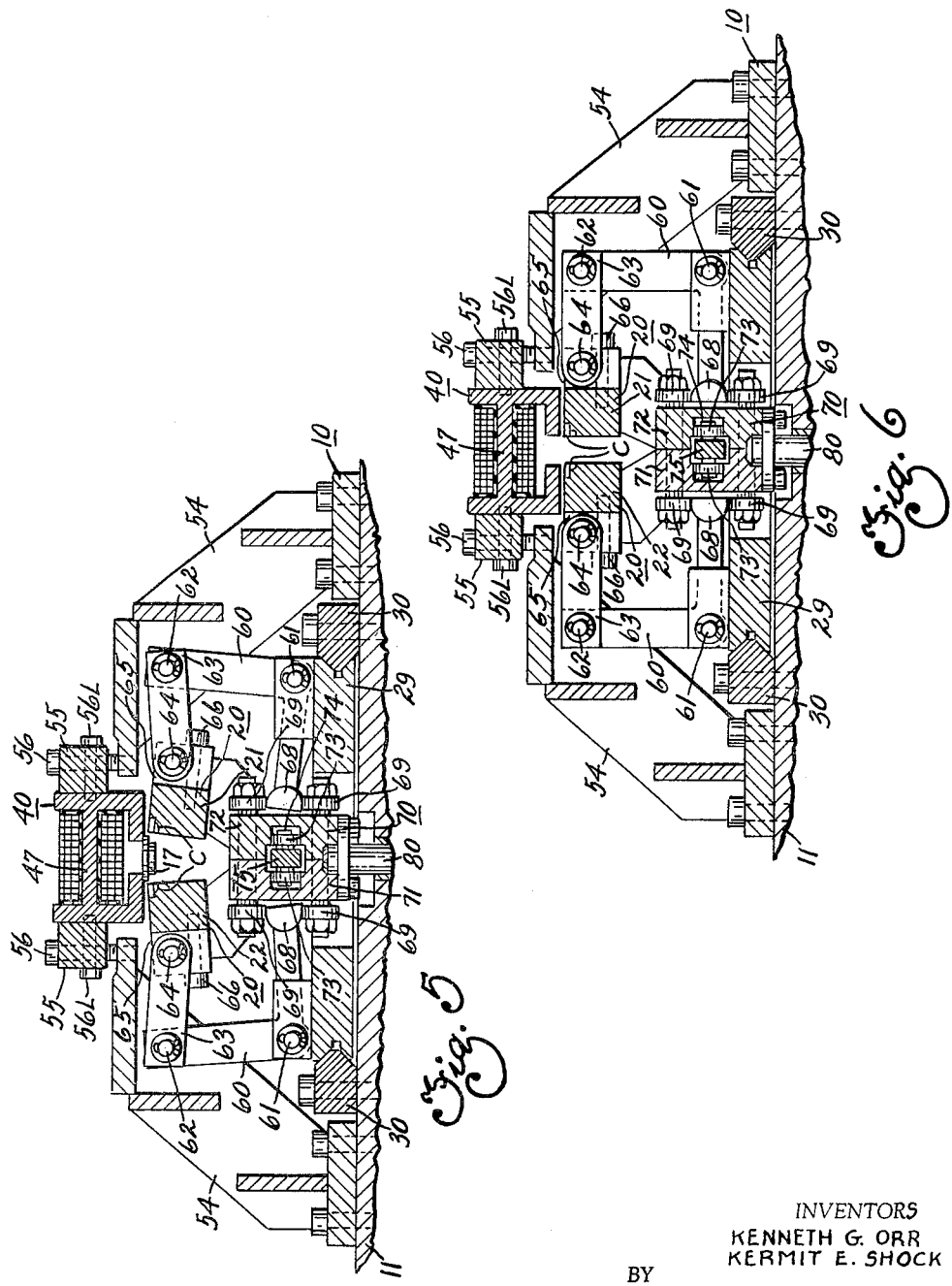

United States Patent Office 3,210,834
Patented Oct. 12, 1965

3,210,834
ASSEMBLING MACHINES WITH ELECTRO-
MECHANICAL FEEDER DEVICE
Kenneth G. Orr and Kermit E. Shock, Dayton, Ohio,
assignors to General Motors Corporation, Detroit,
Mich., a corporation of Delaware
Filed Jan. 27, 1964, Ser. No. 340,442
11 Claims. (Cl. 29—208)

This invention relates to parts supply and, more particularly, to equipment which can be adapted for feeding automotive as well as appliance machine assembly parts.

Manual feeding of some parts during mass production operations has been continued at times because of need for holding such parts or components and accurately effecting proper placement thereof in a particular position. Thus in spite of danger to fingers or hands of an operator, there was believed to be no other practical method of achieving such unique placement of parts or components in proper number when and where needed along an assembly line. Accordingly, an object of the present invention is to provide new and improved electromechanical feeder equipment having features which can be adapted for forwarding relatively small parts such as washers, for example, during automotive shock absorber assembly as well as larger parts such as discs or laminations for example, during dynamoelectric machine assembly.

An object of this invention is to provide apparatus including a fixed magnetic means extending along a predetermined path and intermittently energizable to hold parts or components while a "walking beam" or movable means adjacent thereto is indexed to and fro for a distance gaged accurately regardless of space available and positioning of parts required in a uniform flow of supply.

Another object of this invention is to provide apparatus having a plurality of stations along a predetermined path for progressively holding parts or components such as washers and laminations in a series of fixed positions maintained by variation of attracting forces such as pressure differential or vacuum for non-ferrous material as well as magnetically for ferrous material only during return stroke of reciprocable feeder means having movement in three dimensional manner for differing feed purposes to attain a final goal.

A further object of this invention is to provide an electromechanical feeder device having a fixed magnetic channel means with a plurality of stations for temporarily retaining parts or components which are lifted up thereto and released onto a carrier means of nonmagnetic material having portions thereof movable laterally away from each other adjacent to one end thereof which is shifted longitudinally into a parts installation positioning and retracted in a cycle mechanically motorized in a sequence always resiliently retractable for repetition of parts feeding in a progressive manner.

Another object of this invention is to provide in combination a pair of rail portions of non-magnetic material movable laterally of each other within a range governed by gauge means therebetween and cam means which also control a rocker action for all movement up and down for temporary release of parts or components being carried subject to retention thereof in all but a last position between the rail portions which shift longitudinally and spread away from each other for installation release of the part or components in a particular position.

Further objects and advantages of the present invention will become apparent from the following description, reference being had to the accompanying drawings wherein a preferred embodiment is clearly shown.

In the drawings:

FIGURE 3 is a view taken along line 3—3 in FIGURE 1.

FIGURE 4 is a side view with parts broken away and taken substantially in the direction of arrows 4—4 of FIGURE 1.

FIGURE 5 is a cross-sectional view taken along line 5—5 in FIGURE 1 during one operating condition.

FIGURE 6 is a cross-sectional view like that of FIGURE 5 during another operating condition.

Figure 1:
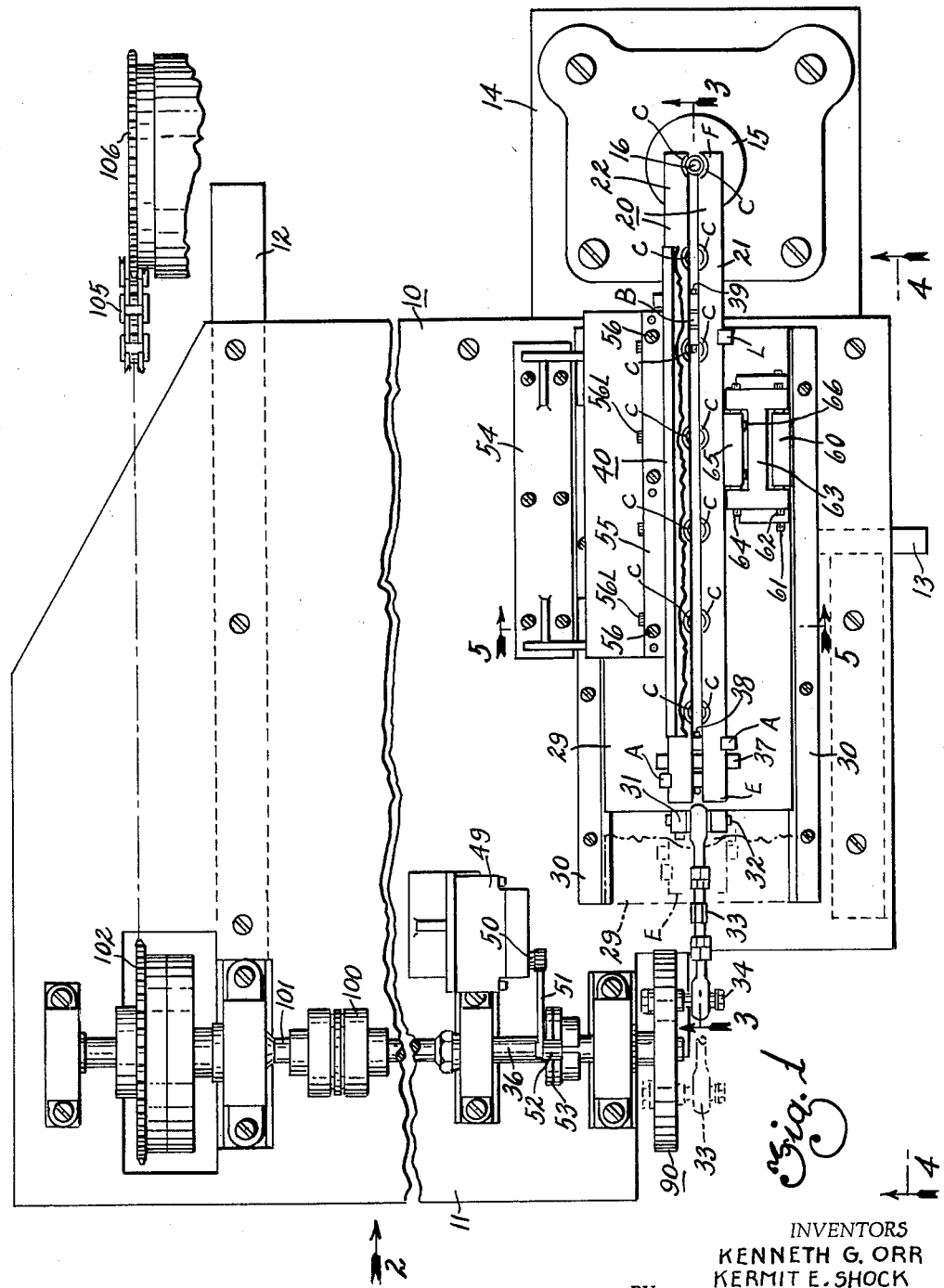
FIGURE 1 is a plan view of equipment having features in accordance with the present invention.
Figure 2:
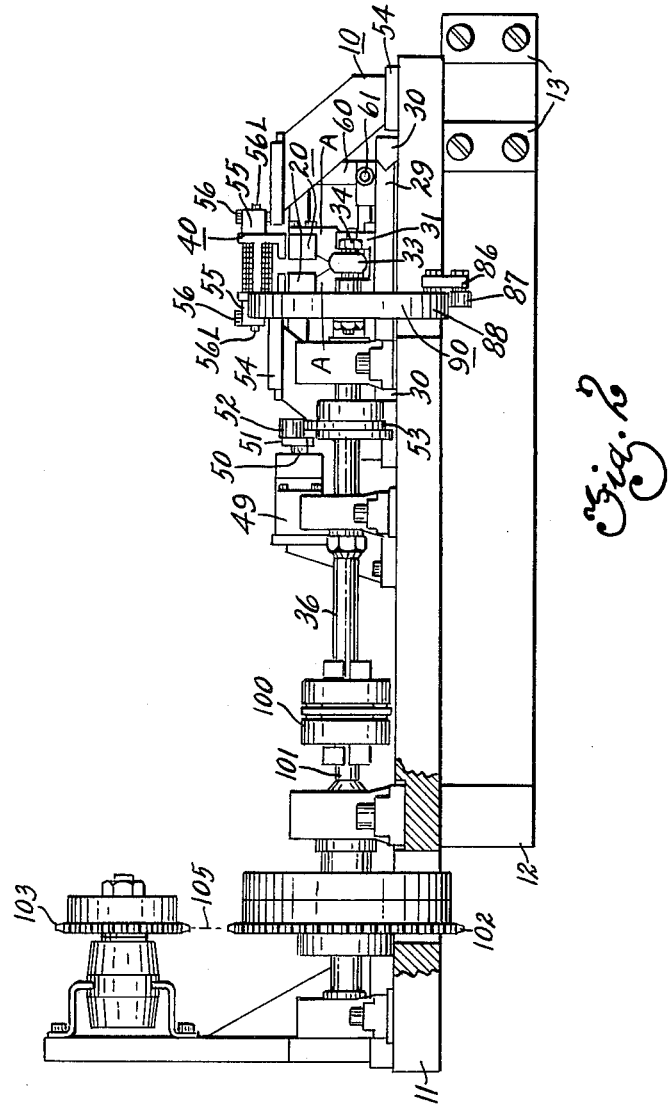
FIGURE 2 is an end view of the equipment of FIGURE 1.

FIGURE 1 is a plan or top view of equipment or apparatus generally indicated by numeral 10 having a base or support 11 extending substantially horizontally as can be seen in FIGURE 2. Suitable carrier means 12 and 13 can be located along an underside of the base or support 11 as indicated in views of FIGURES 1 and 2. In FIGURE 1 there is shown a work location or station 14 wherein a shock absorber means 15 can be positioned to have a stud or bolt 16 thereof extend vertically to one side of the support or base 11. This stud 16 can also be seen in the view of FIGURE 3 and is to have a washer means or disc 17 fitted onto a tapered end 18 thereof. The washer means is moved progressively to this final installation location by a "walking beam" or movable means generally indicated by numeral 20 in the drawings. This movable means 20 includes first and second rail portions 21 and 22 respectively extending substantially longitudinally of each other subject to reciprocating movement as well as spreading apart to be described subsequently herein. These first and second rails 21 and 22 collectively form carrier means of non-magnetic material such as aluminum recessed as indicated by a reference numeral "R" in FIGURE 3 adjacent to the work station and having complementary semi-arcuate cutouts "C" into which discs or washers can sit as said from a track or supply means 24 indicated in FIGURE 3. The track or supply means 24 can have a spring means 25 carried thereon for biasing the washer or disc means 17 downwardly into the carrier cutouts "C." It is to be understood that a vibrating drum or other supply reservoir can be attached to an upper end of the track 24 in a well known manner. The washers 17 can escape from a lower end of the track 24 only when an end "E" of the rail or carrier means 20 has been moved to the left as seen in FIGURE 3 such that a pilot or post means 26 can receive disc or washer means 17 spring biased thereto by a flat resilient member or spring 25. This pilot or post means 26 can be suitably journaled in a bushing 27 press fitted to a hollow vertical support 28 that is mounted on a shiftable carriage 29 having a dove-tail fit on guide means 30 fixed to support or base 11 as indicated in the drawings. This carriage 29 has an extension or bifurcated projection 31 secured to one end thereof such as by welding or brazing as can be best seen in views of FIGURES 1, 3 and 4 of the drawings. A pin or rod 32 is secured to this bifurcated member 31 and one end of an adjustable link means 33 is journaled as to the pin or rod 32. An opposite end of the adjustable link means 33 is secured by a bolt or pivotal fastening member 34 to an internal or first cam portion 35 journaled for rotation about an axis of a power driven shaft 36 as can be seen in views of FIGURES 1, 2 and 4. Movement of the first cam portion 35 as to the axis of the shaft 36 results in a shifting of the link means 33 which transmits a to and fro movement periodically to the carriage 29 slidable along the guide means 30. This to and fro movement also is imparted to the rail portions 21 and 22 by way of a block 37 which supports pin or pivot means 38 extending substantially parallel to the guide means 30 and substantially longitudinally in alignment with the rail portions joined by arms indicated by a reference numeral "A" in FIGURES 3 and 4 of the drawings. An opposite end of each of the rail portions is similarly pivotally journaled by provision of a bracket indicated by a reference "B" secured such as by welding or brazing to the carriage 29 and having a pivot pin 39 that is provided with suitable bushings as bearings for pivotal arms or links indicated by a reference numeral "L." This structure can be best seen in the view of FIGURE 3 of the drawings.

Fixed magnetic means generally indicated by numeral 40 in the drawings can include a plurality of stations or probes indicated by numerals 41, 42, 43, 44, 45 and 46 joined to each other by a channel or body portion 47 all of magnetic material. It is to be understood that this channel 47 can be fitted with an energizing solenoid or coil and also that in some instances each of the probes or stations can be individually fitted with such coils electrically energizable by way of a switching means 49 that can be seen in views of FIGURES 1, 2 and 4 of the drawings. Such switching means 49 can have a shaft portion 50 carrying a link or lever 51 having a roller or bushing 52 journaled at a free end thereof movable along an outer periphery of a cam means 53 visible in views of FIGURES 1, 2 and 4 of the drawings. This cam means 53 has a radial recess extending for substantially one-half of the periphery thereof and a radial projection or enlargement for a remainder thereof such that the lever 51 can be shifted accordingly to impart a rotative movement to the switch shaft 50 thereby effecting "on" and "off" electrical energization of magnetic coil means for the fixed magnet means 40. The magnet means 40 can be secured to the base or support 11 by suitable brackets 54 which can be seen in views of FIGURES 2 and 4. Brackets 54 can have beam portions 55 on opposite sides of the channel or body portion 47 of the electrically energizable magnet means 40 adjustable as to vertical positioning of the magnet means due to screws or fasteners 56 as shown in views of FIGURES 2 and 4. The magnet means is energizable periodically as noted so that discs or washer means 17 can be attracted to the stations 41 through 46 inclusive at predetermined times during cycling operation of the apparatus in accordance with the present invention. Since the body portion 47 of the channel is made of magnetic material the discs or washers 17 are also made of magnetic ferrous material that can be attracted magnetically while the rails or carrier means 21–22 are made of non-magnetic or aluminum material. It is noted that the stations 41 through 46 inclusive have predetermined spacing as to each other and as to the cutouts or recesses indicated by reference "C" such that discs or washers can be moved for a distance equivalent to that between adjacent stations progressively until a final station 46 is reached due to incremental movement of the disc or washer in accordance with to and fro movement of the carrier means 20 collectively. Thus each time the carrier means 20 is moved or retracted to the left as viewed in FIGURE 3 a final positioning end indicated by reference "F" is caused to move into alignment with the final station 46 subject to sliding movement between the carriage 29 and guide means 30 as controlled by the first cam portion 35 such that the final end indicated by reference "F" is again positioned above a tapered end 18 of a stud 16 onto which a washer or disc is to be assembled. The magnet means 40 is energized for a time interval during which the retraction or movement to the left occurs for the carrier means 20 including the rails 21 and 22. The magnet means 40 can be deenergized so as to release the discs or washers being held and thus deposit it into corresponding cutouts or recesses indicated by reference "C" as well as the final end indicated by reference "F" when the final end is inalignment with the final station 46. Movement of the carrier means 20 including the opposite rail portions 21 and 22 occurs simultaneously to the right during a period of time when the magnet means 40 is deenergized in accordance with actuation of the switch means 49.

When the final end portion indicated by reference "F" is in alignment with the stud or final assembly station the rails 21 and 22 are caused to be separated or pivoted away from each other thereby releasing a disc or washer means previously held in recessing of the final station indicated by reference "F." The view of FIGURE 5 of the drawings shows such rail portions 21 and 22 pivoted away from each other while in the view of FIGURE 6 the rail portions are moved into a location adjacent to each other as during reciprocable movement or force transmitted thereto by shifting of the carriage 29 along the guide means 30. The view of FIGURE 5 shows a disc or washer means 17 being held by the magnet means 40. In FIGURE 6 the washer or disc means is left out to facilitate viewing of the structure involved. Also in FIGURE 5 it is to be noted that lateral adjusting screws 56L are shown for accurate positioning of the magnet means centrally above and intermediate the rail portions 21 and 22 of the carrier means 20. Outward and inward tilting of the rail portions 21 and 22 occurs in accordance with movement of bell crank means or angular levers 60 for each of the rail portions and journaled by pivots or pins 61 as can be best seen in views of FIGURES 5 and 6 of the drawings. Upper ends of the bell crank means are secured by further pivots or pins 62 to members 63 journaled at 64 to the rail portions 21–22 of the carrier means 20. The journaling portions 64 are carried by blocks 65 held by fastening means 66 to one side of each of the rail portions. Inner lower ends of the bell crank 60 have semi-arcuate cam portions 68 engageable by rollers or bearing means 69 along opposite sides thereof. These rollers or bearing means 69 are journaled by suitable pins or bolts extending transversely through central block or gauge means generally indicated by numeral 70 as can be best seen in views of FIGURES 5 and 6 of the drawings. This block means 70 can also be seen in FIGURE 3 of the drawings and has first and second portions 71 and 72 thereof adapted to mate and complement each other such that collectively a cam guide means indicated by reference numeral G is provided internally thereof and engageable by roller means 73 carried by a pin 74. This roller means 73 journaled by the pin 74 can be carried at one end of a rocker arm 75 which is centrally pivoted by a pin at 76 as as indicated in FIGURE 3. An opposite end of this rocker arm 75 is indicated by numeral 77 and fits between rollers 78 journaled by pins 79 carried by a lower end of the pilot portion 26 which can be moved up and down in accordance with movement of the roller means 73 following the cam indicated by reference "G." The roller means 73 move along the cam means indicated by reference "G" during to and fro movement of the carriage 29 since the rocker arm 75 is journaled by pivot 76 that is carried by a support 76S secured by brazing or welding to the carriage 29 as can be seen in FIGURE 3.

Also the block means 70 has a pair of rods 80 secured to an underside thereof as can be seen in the views of FIGURES 3–6 inclusive. These rods 80 are journaled for axial movement through sleeve bearing portions 81 and there is a plate 82 shown in FIGURE 4 secured to a lower end of the rods 80. This plate 82 has a pivotal and slide juncture indicated by reference numerals 83 with one end of a beam or lever 84 centrally pivoted at 85. This beam or lever 84 has an opposite end 86 carrying roller means 87 for following a cam portion 88 of a cam means generally indicated by numeral 90. This cam means 90 includes both the cam portion 88 as well as the first cam portion 35 which also has cam means 53 thereon. Positioning of the cam portions as to each other can be adjusted by variation of positioning of fastening means 91 as to slots 92 shown in FIGURE 4 of the drawings. The pivot or pin 85 is carried by a bracket 89 secured to an underside of the support or base 11 as also shown in FIGURE 4. The rollers 87 as they follow the cam means 88 effect predetermined up and down movement of the block means 70 such that rollers 69 in engagement with the ends 68 of the bell crank means 60 can be caused to pivot about the axis 61 on each side of the block thereby tilting the rail portions or carrier means apart. During movement of the rail portions away from each other the spacing therebetween is sufficient for dropping the disc or washer means 17 onto the stud or assembly point in the work station. Movement of the roller means 73 along the cam guide portion indicated by reference "G" effects shifting of the pilot or post 26 up and down. The post 26 is moved upwardly when the carriage 29 is moved or retracted to the left as viewed in FIGURE 3 such that washer means 17 is positively engaged for movement to a first station 41 of the magnet means 40. Such disc or washer means 17 can be moved incrementally to adjacent stations which can have any suitable number of intermediate locations to assure continuous supply and feeding of disc or washer means to the final installation end indicated by reference "F." Each subsequent retraction of the rail means assures obtaining of a further disc or washer means and each to and fro movement results in progressive feeding of such disc or washer means only from one station to an adjacent location for a predetermined span of movement which terminates finally in a movement onto an assembly point or station. It is to be understood that all intermediately located washers or discs are magnetically held above the rail portions as they are tilted away from each other during release for final assembly onto a stud or other assembly station. The magnet means itself never moves but is only subjected to intermittent energization electrically. The "walking beam" or aluminum rails are moved to and fro and also tilted for predetermined distances axially and laterally thereof respectively. The lever 84 controls all up and down movement and suitable spring means can be provided for biasing the aluminum rail portions or carrier means normally to a retracted position or toward the left as viewed in FIGURE 3 of the drawings. Also spring means can be provided in tension for normally holding the rail or carrier portions toward each other rather than tilted apart. Thus, normally a spring biased or resilient nest is formed between the rail means. For purposes of clarity the spring means are being mentioned though illustration thereof in the drawings is deemed unnecessary.

It is to be noted for conveying non-ferrous materials that in place of an electrically energizable magnet means such as 40, equipment in accordance with the present invention could be provided with differential pressure holding structure such as a vacuum means which could be temporarily actuated for holding the washers or disc means upwardly during indexing of the carrier or rail portions immediately after the carriage 29 has completed its movement toward the right as viewed in FIGURE 3. Thus the application of vacuum force or differential pressure as well as electrical magnetization can occur during tilting of the rail or carrier portions away from each other for release of a washer or disc from the final end position indicated by reference "F" and continuing to hold such washer or disc means until the rail portions are returned longitudinally to the left as viewed in FIGURE 3 such that the final position indicated by reference F is again in nesting relationship below the final station 46 for example. The magnet means or differential pressure would be ineffective during movement of the rail or carrier means to the right into an end position as indicated in FIGURE 3 subject to reenergization of the magnet means or differential pressure means for temporarily holding the discs or washer means upwardly before permitting lateral spreading and moving apart of the rail portions for release of the washer or disc means from the final position indicated by reference "F."

It is to be understood that washer means 17 have a central cylindrical extension on one side thereof, and thus such washer means are polarized or adapted to be installed in a particular direction. The machine operation of the equipment in accordance with the present invention assures continuous feeding of such washer means in a proper relationship as to the stud 18. Manual handling of such washer means can result in inadvertent transposing of the positioning of such washer means which would result in a defect or failure of shock absorber means for instance subjected to manual positioning of such washer means. Thus possibility for human error is substantially eliminated by use of equipment in accordance with the present invention. It is to be understood that the diameter of the washer means or discs is immaterial so far as the structural relationship of the features of the present invention are concerned. Thus larger spacing between the rail or carrier portions can be provided to permit mechanical advancing of dynamoelectric machine laminations which can be added to a stackup in a particular work station. The pilot or wipe-off pin 26 could also be enlarged to fit centrally into a bore of a rotor or stator lamination. The entire arrangement in accordance with the present invention can be driven by a motor means which can transfer power to the shaft 36 by way of a coupling means 100, shaft extension 101 and sprocket 102 as well as an idler sprocket 103. The idler sprocket is shown in the view of FIGURE 2 and suitable journaling support can be provided for these components. The sprocket can be driven by a chain means 105 fitted to a motor driven gear or sprocket 106. The magnet means can be energized by any suitable source or by conversion of higher voltage supply lines to a lower voltage value which may be rectified in any suitable way subject to on and off actuation by the switch means 49. The magnet means when actuated by direct current power serves as an electromagnetic chuck to retain parts at the end of the stroke or movement of the carrier or rail portions to the right as viewed in FIGURE 3. All movement is positive cam and spring operated. The sprocket 106 could also be powered from a press crankshaft rather than from a motor means. The pilot or pin portion 26 moves between the loading position below the spring 25 and the first station 41. When apparatus in accordance with the present invention is used for forwarding dynamoelectric machine laminations the final assembly point can be on a punch press having a turret or multi-position table on which laminations can be interlocked and assembled in accordance with a disclosure of a U.S. Patent 3,110,831—Zimmerle issued November 12, 1963 as well as a copending application S.N. 125,190—Zimmerle filed July 19, 1961 both belonging to the assignee of the present invention. Reference can also be made to a U.S. Patent 3,006,062—Loy issued October 31, 1961 for a multi-position table or turret of assembling apparatus for dynamoelectric machines. Also it is to be noted that what is termed a disc or washer means in the present disclosure can be in effect a valve member such as identified by reference numeral 24 in a Patent 3,046,002—Schmitz issued July 24, 1962. It can be seen that such a rebound valve means 24 in shock absorber structure of this Patent 3,046,002—Schmitz issued July 24, 1962 has a structure similar to that identified by reference numeral 17 in the drawings of the present disclosure.

While the embodiment of the invention as herein disclosed constitutes a preferred form, it is to be understood that other forms might be adopted.

What is claimed is as follows:

1. In an assembling apparatus, a feeder apparatus for forwarding assembly parts such as discs, washers, laminations and the like to an assembling station, comprising, fixed means for temporarily holding parts in predetermined locations extending along a path from a parts supply track to a location short of said assembling station by variation of holding force exerted only through said fixed means on the parts, movable walking beam means including complimentary recess-forming portions which can move both laterally away from and toward each other as well as longitudinally to and fro on one side of said fixed means, and motorized cam means for programming to and fro shift of said movable walking beam means longitudinally as well as laterally to permit periodically cycled release of parts in a predetermined location said complementary recess-forming portions receiving parts that are positioned alternately with said fixed means which comprises an electromagnetic channel having predetermined projections which serve as energizable stations to hold parts only temporarily during retraction of said movable walking beam means.

2. The apparatus of claim 1 wherein said fixed means is an adjustable electromagnetic channel per se having predetermined projections to one side thereof as energizable stations to hold parts temporarily though parts otherwise are supported in bridged relation on said complementary recess-forming portions also for shifting the parts progressively to a final assembly position thereof, said parts being held magnetically in predetermined preassembly station locations while one part in final assembly position is permitted to fit in proper positioning during temporary lateral movement of said complementary portions away from each other subject to longitudinal retraction of said complementary portions due to cam means operation when recess-forming relation is re-established to receive further parts.

3. The apparatus of claim 1 wherein said fixed means includes a channel of ferrous material periodically magnetically energizable due to action of cam means and said movable walking beam means includes said complementary portions as carrier rails of non-ferrous material such as aluminum.

4. The apparatus of claim 1 wherein said cam means includes a first cam portion that is linked to effect longitudinal to and fro movement of said complementary portions as well as a further cam portion that alternately effects translation of force for spreading said complementary portions laterally apart.

5. The apparatus of claim 1 wherein said movable complementary portions have pivotal connection on a longitudinally slidable base-supported carriage on which bell crank means are journaled for movement in response to cam means actuation to effect lateral movement of said complementary portions away from and toward each other.

6. Electromechanical feeder apparatus, comprising, fixed magnetic means extending along a predetermined path from a parts supply track to a location short of parts installing position, said fixed magnetic means being intermittently energizable to hold certain parts, and a movable "walking beam" means having complementary portions with parts-receiving recessing all but at least one of which is in alignment laterally with said fixed magnetic means during energization thereof such that a part free of magnetic force is left to fit into installing position during movement of said complementary portions laterally away from each other, and motorized program means including cam portions to effect periodic magnetic energization as well as longitudinal and lateral movement of said complementary portions.

7. The apparatus of claim 6 wherein a pilot wipe-off member is located intermediate said complimentary portions in a position remote from the installing position and aids in transfer of parts such as washers, discs and the like from a supply track.

8. The apparatus of claim 6 wherein said complementary portions are journaled for tilting movement and are resiliently biased to be normally substantially in parallel with each other.

9. In combination, a pair of longitudinally adjacent and substantially parallel rail portions of non-magnetic material as walking beam carrier means movable both laterally of each other as well as longitudinally slidable together as mounted on a carriage having a base guide, base journaled cam means having a first portion thereof for control of longitudinal sliding movement of said carriage with said rail portions and a further portion for control of lateral movement of said rail portions per se, and fixed means temporarily actuated by additional cam operation periodically for holding parts away from said rail portions during longitudinal shifting movement of said rail portions being also laterally separated from each other to release a part into installing position in a location beyond holding positions, said rail portions upon longitudinal and lateral retraction receiving additional parts from retention of said fixed means in progressively incremental stations up to the final installing positions.

10. The apparatus of claim 9 wherein said fixed means is a channel of magnetizable material having projections to one side thereof corresponding to recessing of said rail portions to hold parts in bridged relationship across said rail portions and adjustable mounting means to permit variation of vertical and horizontal positioning of said channel.

11. In the apparatus of claim 1, feeder apparatus for forwarding assembly parts such as discs, washers, laminations and the like during mass production operations dangerous to fingers and hands of an operator in locations subject to intermittently actuated holding of parts from supply to installation positioning, which comprises a movable "walking beam" means having complementary portions with parts-receiving recessing all but at least one of which is in alignment laterally with the intermittently actuated magnetic holding means adjacent thereto such that a part free of holding force is left to fit into installing position during movement of said complementary portions laterally away from each other, said complementary portions also being reciprocably movable longitudinally in a paired relationship progressively and repeatedly to transfer parts by way of said recessing thereof into installing position.

References Cited by the Examiner

UNITED STATES PATENTS

| | | | |
|---|---|---|---|
| 3,103,023 | 9/63 | Zdanis | 29—208 |
| 3,118,218 | 1/64 | Gleason et al. | 29—208 |

WHITMORE A. WILTZ, *Primary Examiner.*

THOMAS H. EAGER, *Examiner.*